Oct. 9, 1962    C. G. SOER    3,057,640
WHEEL SUSPENSION DEVICE
Filed Dec. 2, 1960
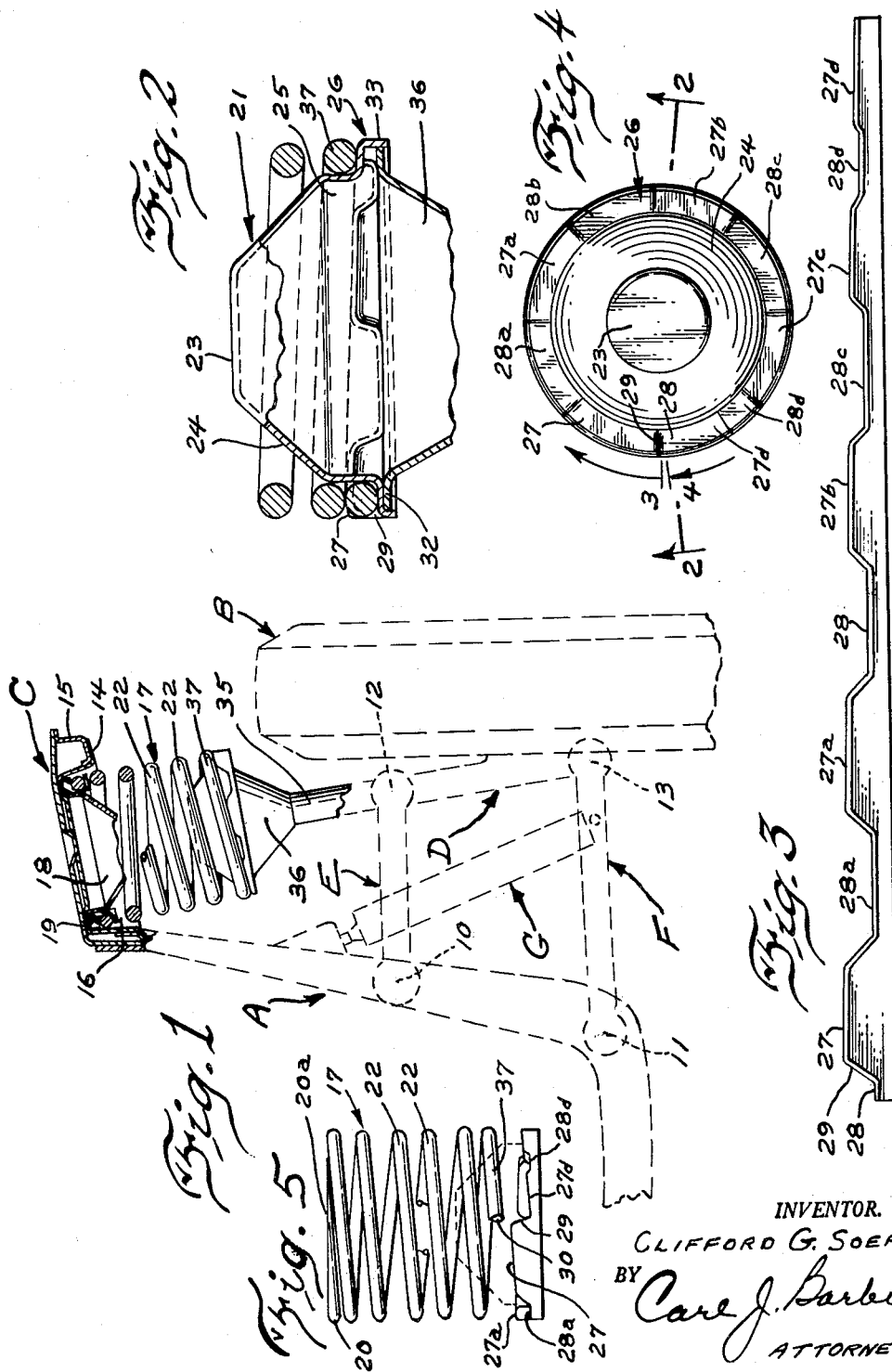
INVENTOR.
CLIFFORD G. SOER
BY Carl J. Barbee
ATTORNEY United States Patent Office 3,057,640
Patented Oct. 9, 1962

3,057,640
WHEEL SUSPENSION DEVICE
Clifford G. Soer, Bristol, Wis., assignor to American Motors Corporation, Kenosha, Wis., a corporation of Maryland
Filed Dec. 2, 1960, Ser. No. 73,399
4 Claims. (Cl. 280—96.2)

The invention relates to vehicle suspension systems wherein the body of an automobile is resiliently suspended with reference to its wheels.

The invention has particular reference to a suspension system employing a helical coil type spring. In the instant application, the coil spring is interposed between the upper end of the steering knuckle pin assembly and the wheel housing which forms part of the automobile body.

A principal object of the invention is to provide a spring and spring seat assembly for a suspension system in which cost reductions are attained.

A specific object is to provide a spring seat having an annular flange formed with alternating bosses for providing, in one instance, a ramp for supporting the lowermost convolution of the spring and, in another instance, for providing an interrupted circular seating shoulder for bearing against the upper end of the steering knuckle pin assembly.

A further specific object is to provide a combination spring and steering knuckle pin seat which is in the form of a singular stamping.

A further object is to provide a spring seat which permits the use of a coil spring having its final convolution of a diameter common with the diameter of the preceding convolutions and in which elimination of an otherwise necessary rubber washer is accomplished.

Other objects and advantages of the invention will be apparent from the ensuing specification and appended drawing in which:

FIG. 1 is a generally schematic front view of a suspension system with the inventive portion of the system shown in solid lines and also partly in section.

FIG. 2 is a fragmentary sectional view of the lower portion of the spring and the spring seat member and taken on a line which would be situated, such as line 2—2 of FIG. 4.

FIG. 3 is an extended schematic view of the flange portion only of the spring seat stamping commencing from the point 3 and terminating at the point 4 as indicated in FIG. 4—such figure being intended for illustrating the arrangement of the seating bosses.

FIG. 4 is a plan detail view of the spring seat stamping.

FIG. 5 is an exploded view on a scale reduced from FIG. 2 and showing the coil spring and the spring seat with its tower portion removed but indicated in dotted lines.

In FIG. 1, I have shown generally schematically the suspension system for one of the front wheels of an automobile wherein only a portion of the automobile body is shown. Such portion includes a wheel housing which has its generally vertical wall portion A adjacent to the wheel B and an outwardly extending roof portion C overhanging the wheel.

The wheel is carried on a steering knuckle pin D and upper and lower control arms E and F are pivotally mounted at their inner ends 10 and 11 to the vehicle body A and are pivotally mounted at their outer ends 12 and 13 to the steering knuckle pin. A shock absorber G may extend between the lower control arm and the wheel housing.

Thus, the vehicle body is free to move up and down with reference to the wheel B as permitted by the swinging of the control arms. All of the foregoing apparatus is conventional in a wheel suspension system and hence is shown only schematically.

The upper end of the wheel housing is generally reinforced with stampings 14 and 15 which are recessed at 16 to provide a pocket into which the upper end of the coil spring 17 projects.

A spring seat 18, in the form of a stamping, is received in the pocket 16 and projects into the interior of the upper end of the coil spring. A circular rubber washer 19 is mounted on the upper-most convolution of the spring and serves to dampen undesirable noises which would otherwise be transmitted from the spring to the vehicle body.

Referring to FIG. 5, it should be noted that the upper-most convolution 20 of the spring has a gradually diminishing thickness at 20a to permit the spring to seat flat in the wheel housing pocket. The diminishing thickness is accomplished by means of an additional fabrication step, such as shearing, during the manufacture of the spring.

Viewing FIG. 5, it will also be noted that the lower-most convolution of the spring continues of the same diameter as the preceding or intermediate coils 22 of the spring, eliminating any additional fabricating step at this end of the spring.

A spring seat identified generally by the numeral 21 is formed as a singular stamping having a central tower portion 23 which includes a conically tapered wall 24 merging with an annular wall portion 25 which serves to axially locate the lower-most coils of the spring.

The wall portion 25 merges with the radially outwardly extending annular flange portion identified generally by the numeral 26. The flange portion is formed into circumferentially spaced ramp bosses identified by the numerals 27, 27a, 27b, 27c, and 27d and circumferentially spaced shoulder bosses 28, 28a, 28b, 28c, and 28d (as best viewed in FIG. 3).

The ramp bosses collectively provide a ramp which completely encircles the wall 25. The shoulder bosses 28, 28a, 28b, 28c and 28d are formed between successive ramp bosses and collectively provide a circular shoulder against which the upper bearing face of the annular flange 32 of the steering knuckle pin assembly bears.

An axially directed circular flange 33 projects below the diametric plane defined by the undersides of the collective shoulder bosses so as to telescopically receive and guide the flange 32.

The steering knuckle pin assembly includes the upwardly extending section 35 which merges with the conically flared upper-most section 36. The section 36, as has been previously mentioned, terminates with the radially outwardly extending circular bearing flange 32.

The lower-most convolution 37 of the coil spring is provided with a pitch which is substantially common with the pitch afforded by the circular ramp which consists of the collective ramp bosses. Thereby, the lower end of the coil spring rests on the circular ramp throughout a 360 degree extent. The ramp boss 27 provides a wall 29 which serves as the locating point against which the end 30 of the coil spring impinges.

It has been found that with this arrangement at the lower end of the coil spring it is not necessary to employ a circular rubber washer of the type employed at the upper end of the spring. That is, the noise problem is adequately controlled in the lower end of the spring even though there is metal to metal contact.

By permitting the lower-most convolution of the spring to have a constant diameter, there is no need for performing any additional fabricating operation at the lower end of the spring, such as is necessary at the upper end of such spring. Thus, manufacturing costs of the coil spring are reduced. By forming the spring seat 21 as a singular stamping, manufacturing economies are also attained.

Thus, it can be seen that the alternate forming of the ramp bosses and the shoulder bosses makes possible a spring seat member which performs the combined function of serving as an inclined circular seat for the coil spring as well as serving as a circular bearing shoulder for the upper end of the steering knuckle pin assembly.

I claim:

1. A suspension system for suspending a vehicle body relative to a wheel, said system comprising: a steering knuckle pin assembly; a wheel carried by such assembly; control arms connected to the vehicle body and to the steering knuckle pin assembly for swingably carrying the vehicle body relative to the wheel; a helical coil spring having a final lowermost convolution in helical form interposed between the vehicle body and the upper end of the steering knuckle pin assembly for resiliently supporting the body relative to the wheel; a spring seat for interposition between the lower end of the coil spring and the upper end of the steering knuckle pin assembly, said seat having a generally radially directed annular flange formed with alternating upwardly and downwardly directed bosses, the upwardly directed bosses collectively defining a ramp arranged in a generally circular path for supporting the lowermost convolution of the coil spring and the downwardly directed bosses collectively defining a bearing shoulder arranged in a generally circular path for receiving the upper end of the steering knuckle pin assembly the collective bearing shoulder lying in a plane substantially diametric to the axis of the spring and the steering knuckle pin assembly having an end bearing face engaging the collective bearing shoulder.

2. As an article of manufacture a combination spring seat for mounting on one of its sides the helical final convolution of a coil spring and for seating its other side on a support member having a bearing face; said seat including a stamping having a wall portion and a radially outwardly extending annular flange, said flange formed with circumferentially spaced ramp bosses alternating with circumferentially spaced shoulder bosses, the ramp bosses collectively defining a ramp arranged in a helical path on one side of the stamping for seating the final lowermost helical convolution of the spring and the circumferentially spaced shoulder bosses collectively defining a bearing shoulder arranged on the other side of the stamping in an annular path for seating on the bearing face of the support member, the seating surface provided by the collective shoulder bosses lying in a plane substantially diametric to the axis of the spring.

3. As an article of manufacture a combination spring seat for mounting on one of its sides the helical final convolution of a coil spring and for seating its other side on a support member having an end bearing face, said seat formed of a singular stamping including an annular wall portion and a radially outwardly extending flange, said flange formed into circumferentially spaced ramp bosses and circumferentially spaced shoulder bosses, said ramp bosses collectively providing a ramp arranged in a helical path which completely encircles said wall on one side of the stamping for seating the final helical convolution of the spring, said shoulder bosses formed between said successive ramp bosses to collectively provide a circular shoulder arranged on the other side of the stamping for seating on the end bearing face of the support member, the seating surface provided by the collective shoulder bosses lying in a plane substantially diametric to the axis of the spring.

4. An article of manufacture as set forth in claim 3 wherein the final convolution of the spring has a pitch which is substantially common with the pitch afforded by the helical ramp which consists of the collective ramp bosses.

References Cited in the file of this patent

UNITED STATES PATENTS

| | | |
|---|---|---|
| 2,713,485 | Tillou | July 19, 1955 |
| 2,718,409 | Kishline et al. | Sept. 20, 1955 |
| 2,887,310 | Muller | May 19, 1959 |